No. 820,650. PATENTED MAY 15, 1906.
L. KRIMMELBEIN.
FEED CONTROL VALVE DEVICE FOR FLUID PRESSURE BRAKES.
APPLICATION FILED MAR. 6, 1903.
2 SHEETS—SHEET 1.
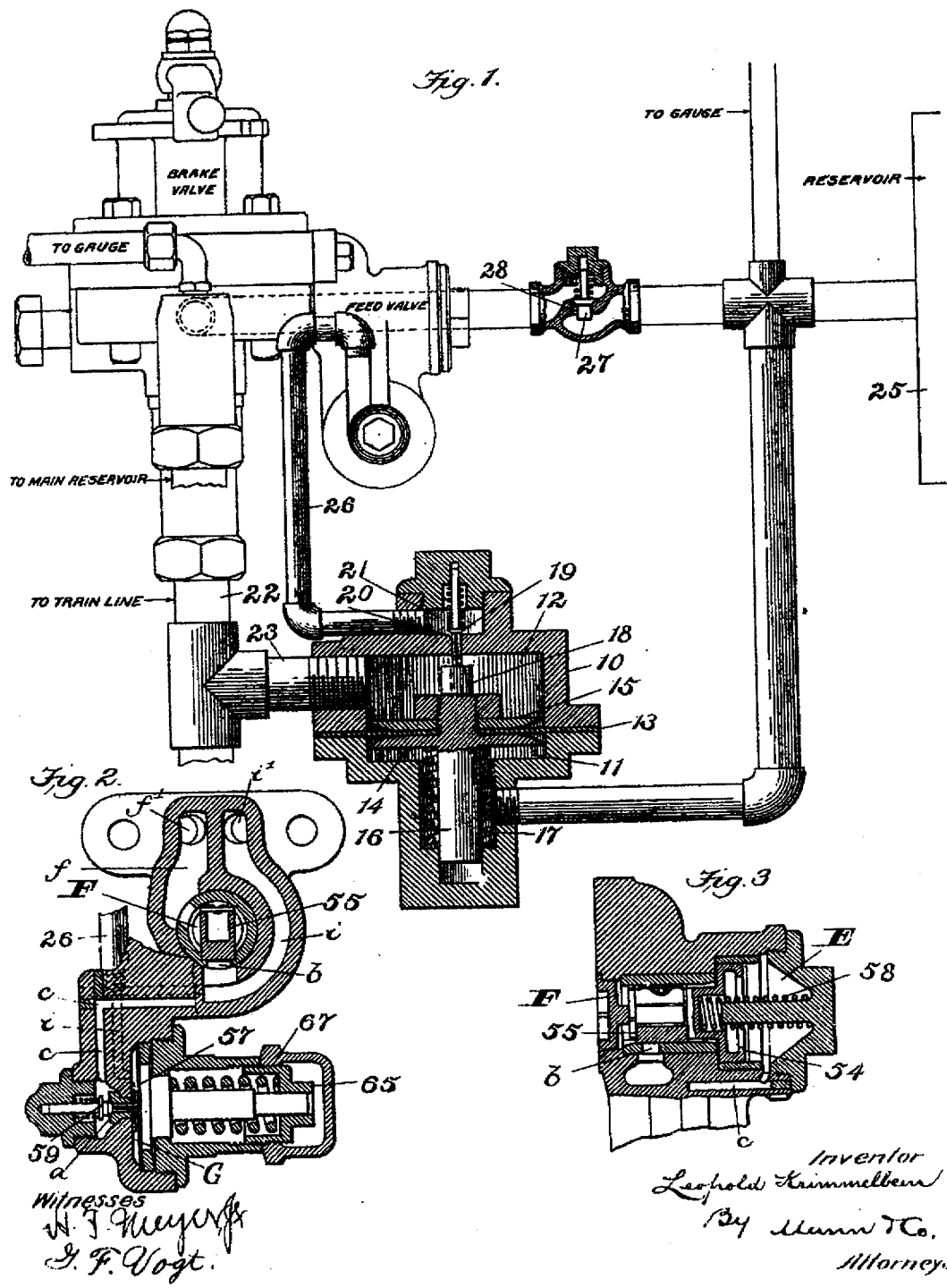

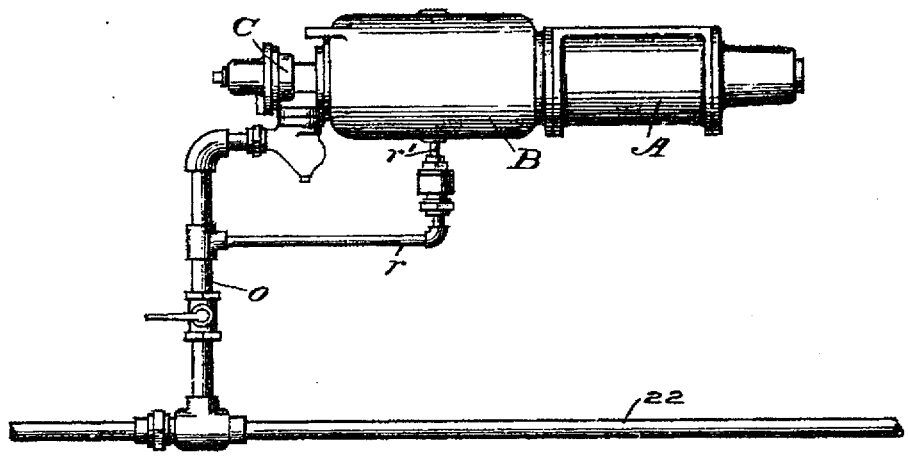
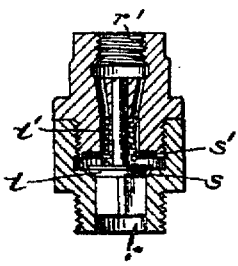

UNITED STATES PATENT OFFICE.

LEOPOLD KRIMMELBEIN, OF BALTIMORE, MARYLAND, ASSIGNOR TO THE WESTINGHOUSE AIR BRAKE COMPANY, OF PITTSBURG, PENNSYLVANIA, A CORPORATION OF PENNSYLVANIA.

FEED-CONTROL VALVE DEVICE FOR FLUID-PRESSURE BRAKES.

No. 820,650. Specification of Letters Patent. Patented May 15, 1906.

Application filed March 6, 1903. Serial No. 146,455.

*To all whom it may concern:*

Be it known that I, LEOPOLD KRIMMELBEIN, a citizen of the United States, residing at Baltimore, State of Maryland, have invented certain new and useful Improvements in Feed-Control Valve Devices for Fluid-Pressure Brakes, of which the following is a specification.

This invention relates to automatic fluid-pressure brakes, and has for its object to provide means for controlling the supply or feed of fluid under pressure to the train-line while the brakes are applied.

With the present standard construction of automatic air-brake apparatus when the brakes have been applied by the usual reduction of train-pipe pressure and the engineer's brake-valve placed in lap position all communication from the main reservoir to the train-pipe is cut off and the train-pipe and auxiliary reservoirs cannot be recharged until the brakes are released. While the brakes are thus applied any further reduction in train-pipe pressure due to leakage serves to increase the force of the application through the automatic action of the triple valve, so that the braking pressure may be greater than was intended, thereby unnecessarily depleting the auxiliary reservoir.

In order to maintain a safe working pressure in the auxiliary reservoirs at all times and to eliminate the effect of train-pipe leakage upon the force with which the brakes are applied in service applications, it is desirable to be able to maintain train-line pressure or to slowly feed up the same during the time that the brakes remain applied, such increase in train-line pressure being at a predetermined rate less than that required to release the brakes.

Various forms of recharging devices for recharging the auxiliary reservoirs while the brakes remain applied have heretofore been proposed, some of such devices including an additional communication between the train-pipe and auxiliary reservoir around the triple valve for recharging without moving the triple valve to release position and others comprising retaining-valve devices for closing the exhaust-port while the reservoirs are recharged through the feed-groove of the triple valve. Nearly all of these devices are operated to effect the recharging by a slow and gradual rise of train-pipe pressure as distinguished from a sudden or rapid rise of train-pipe pressure which causes the release of the brakes.

It is evident that the size of port-opening through which air may be fed from the main reservoir to the train-pipe for the purpose of recharging the same without releasing the triple valves will vary according to the length of train and capacity of the train-pipe, and in order to maintain a certain train-pipe pressure or secure a slow and gradual increase of the same while the brakes are applied I provide a feed-control valve device operated by the movement of the engineer's brake-valve and adapted to maintain the train-pipe and auxiliary-reservoir pressure while the brakes remain applied or to automatically regulate the increase or feeding up of the train-line to predetermined rate regardless of the length or capacity of the train-pipe, which rate shall be less than that required to release the brakes.

Various forms of valve devices, including a controlling-diaphragm exposed on one side to train-pipe pressure and on the opposite side to a constantly-maintained pressure or a pressure that is varied at a predetermined rate, may be devised for securing this result; but as a preferred form of construction I have shown certain parts of the device so connected up with the present standard feed-valve and equalizing-reservoir of the engineer's brake-valve that these standard devices not only perform their usual functions, but also coöperate with and form a part of my invention while operating to maintain or recharge the train-line while the brakes remain applied, thereby dispensing with unnecessary parts and securing the automatic operation of the device by the movement of the engineer's brake-valve.

In the accompanying drawings, Figure 1 is a view showing a standard form of engineer's brake-valve and pipe connections with my improvements connected therewith, parts thereof being shown in section; Fig. 2, a transverse section of the feed-valve which coöperates with my improvements as herein applied; Fig. 3, a longitudinal section of upper portion of the feed-valve device, showing the main slide-valve and its operating-piston; Fig. 4, a diagrammatic view showing a standard car equipment of an automatic air-brake system with a recharging-valve device applied thereto, and Fig. 5 a section showing the recharging-valve.

In the present instance my invention is embodied in a Westinghouse air-brake system including the standard slide-valve feed-valve heretofore mentioned, although it is susceptible of other embodiments, and in order to give a thorough understanding of my invention I will first refer briefly to the construction and operation of the feed-valve without my invention applied.

Referring to the drawings, the supply-valve chamber F and the passage $f$ and port $f'$ are in direct communication with the main reservoir through the usual port of the engineer's brake-valve when the latter is opened by placing the handle of the brake-valve in "running" position, while the passage $i$ and port $i'$ are in communication with the train-pipe through the usual port and passage in the brake-valve. The letter E designates a chamber separated from the supply-valve chamber F by a supply-valve piston 54, and said chamber E is connected with the passage $i$, and thus with the train-pipe through a passage $c\ c$, a port $a$, (governed by a regulating-valve 59,) and a chamber G at one side of a diaphragm 57. The regulating-valve is normally held open by the diaphragm 57 and regulating-spring 67, the tension of which is adjusted by a regulating-nut 65. In such case the chamber E is in communication with the train-line and contains train-line pressure.

When the handle of the engineer's valve is placed in running position, main-reservoir air is admitted to the supply-valve chamber F, forces the supply-valve piston 54 forward, carrying the supply-valve 55 with it, uncovers the port $b$, and gains entrance directly into the train-line through the passage $i$. The resultant increase in train-line pressure likewise increases the pressure in the chamber G at one side of the diaphragm 57 until it overcomes the tension of the regulating-spring 67, previously adjusted to the desired pressure. The consequent movement of the diaphragm 57 allows the regulating-valve 59 to be seated by its spring, thereby closing the port $a$ and cutting off all communication between the chamber E and the train-line. The main-reservoir pressure in the chamber F equalizes with the pressure in the chamber E by leakage past the supply-valve piston 54, and the supply-valve piston-spring 58, which had become compressed by the comparatively higher pressure in the chamber F, reacts and forces the supply-valve 55 to its normal position, closes the port $b$, and cuts off the communication between the main reservoir and the train-line.

The reduction of train-line pressure below the normal predetermined limit reduces the pressure in the chamber G, permits the regulating-spring 67 to react, forces the regulating-valve 59 from its seat, and allows the accumulated pressure in the chamber E to exhaust into the train-line.

The equilibrium between the pressures on opposite sides of the supply-valve piston 54 being thus destroyed, the higher main-reservoir pressure in the chamber F again forces the supply-valve 55 forward and recharges the train-line through the port $b$ and passage $i$, as before.

The automatic regulating-valve of my invention in its present embodiment comprises a case 10, provided with two chambers 11 and 12, separated by a piston or a diaphragm 13, to which are attached two heads 14 and 15, secured together in any suitable manner, one of said heads being provided with a stem 16, surrounded by a light regulating-spring 17, which is of a tension that will yield under a pressure less than an amount sufficient to move the slide-valve of a triple valve to the release position or sufficient to release automatic retainers or sufficient to release the brakes in any way, and said spring bears against the head 14. The other head 15 is provided with a stud or post 18, designed under certain conditions to contact with (and thereby move to open position) a regulating-valve 19, which is spring-pressed to close a feed-port 20, establishing communication between the chamber 12 and a chamber 21. The chamber 12 is in open communication with the train-pipe 22, in this instance by means of a pipe 23. The chamber 11 is in open communication with a drum 25, which in this instance is the equalizing-reservoir, and the chamber 21 is in open communication with the lower portion of the passage $i$ of the feed-valve hereinbefore described by means of a pipe 26, which is so connected to the feed-valve case, as illustrated in Fig. 2, as to close off entirely the direct communication between the port $b$ and the upper portion of the passage $i$ on the one hand and the chamber G of the feed-valve on the other hand and establishing a communication between the chamber G and the chamber 21 of my regulating-valve.

A check-valve 27 is interposed in the pipe connection between the drum 25 and the brake-valve, and said check-valve opens freely toward the brake-valve and is provided with a leakage-groove 28, all for a purpose presently described.

I shall now describe the conditions under which my invention becomes operative and then describe the operation thereof.

As is well known, a service application of the brakes is effected by a reduction of pressure in the train-pipe, which causes the triple-valve piston to move forward, carrying the slide-valve with it, and as soon as the required reduction has been made the equalization of pressure in the triple-valve case will cause the triple valve to go "on lap"—that is, the piston will move backward independently of the slide-valve far enough to close the graduating-port, but it will not move the slide-valve. Under such conditions if it is desired to recharge the auxiliary reservoirs with the triple valve on lap, where no retainers are used it is necessary to provide a communication between the auxiliary reservoir and the train-pipe other than by way of the usual feed-groove in the triple-valve case, and devices have been devised for this purpose such as that disclosed in my prior patent, No. 715,088, granted December 2, 1902, and also illustrated in Figs. 4 and 5 of the accompanying drawings, in which the train-pipe 22 is shown connected by branch pipe $o$ with triple valve C, auxiliary reservoir B, and brake-cylinder A, and the recharging-valve device is connected by pipe $r$ to branch pipe $o$ and by pipe $r'$ to the auxiliary reservoir. This recharging-valve as covered in said prior patent and also shown more particularly in Fig. 5 of the accompanying drawings comprises the valve $t$, having oppositely-located seats $s$ and $s'$ and a light spring $t'$ for normally holding the valve upon its seat $s$. The operation of the recharging-valve is well understood and will need no further description.

Now to recharge the auxiliary reservoirs the handle of the engineer's brake-valve is placed in running position, which admits air from the main reservoir to the train-pipe through the feed-valve before described; but it has heretofore been practically impossible to so regulate the restoration of pressure in the train-pipe and let the air into the latter slowly enough to recharge the auxiliary reservoirs without moving the slide-valve to the release position and releasing the brakes in view of the fact that the said slide-valve is and should be susceptible to very slight variations in train-pipe pressure, and this becomes more especially apparent in very short trains, where the train-pipe capacity is so small that the restoration is effected quickly and has therefore a greater effect on the releasing of the brakes whether automatic retainers are used or not. It is under such conditions which have heretofore prevailed that my invention becomes operative to automatically regulate the restoration of pressure in the train-pipe and recharge the auxiliary reservoirs while the brakes are in the applied position, and its operation to this end is as follows:

When the brakes are in the applied position and the engineer places the handle of the brake-valve in running position, main-reservoir air is admitted to the chamber F and forces the supply-valve piston 54 forward, carrying the supply-valve 55 with it, thereby uncovering the port $b$ and gaining entrance directly into the train-line through the passage $i$ and port $i'$. At the same time the said main-reservoir air that accumulates in the chamber E and which would otherwise have exhausted into the train-line through the passage $c\ c$, past the valve 59, which is normally held open, and through the port $a$ and passage $i$ if my invention were not applied now with my invention applied must flow into and through the pipe 26 into the chamber 21, through the feed-port 20, into the chamber 12, and thence into the train-line.

As the air from the main reservoir feeds through the port $b$ of the main valve into the train-pipe passage it also passes through the usual ports and passages in the engineer's brake-valve to the equalizing-reservoir, where its flow is restricted by the small leakage-groove 28 in the check-valve 27. The rate at which the pressure in the equalizing-reservoir 25, and consequently in chamber 11 beneath the regulating-diaphragm 13, will increase is therefore limited to a predetermined amount by the restricted passage or leakage groove, which may be made of any desired size to secure a corresponding rate of increase in train-line pressure.

It will be evident that by means of this construction the rate of rise in train-line pressure must be substantially the same as that of the equalizing-reservoir, since as the pressure feeds through the main-slide-valve port directly into the train-pipe the tendency is to increase much more rapidly in the train-pipe; but this higher pressure acting in chamber 12 on the top of diaphragm 13 depresses the same against the lower pressure of chamber 11 and the light spring 17 until the regulating-valve 19 closes, or nearly so, thereby cutting off or restricting the escape of air under pressure from the chamber E back of piston 54, which pressure then accumulates on diaphragm 57 sufficiently to substantially close the diaphragm-valve 59, and then by the immediate equalization around the piston 54 close the main slide-valve, thereby checking the feed to the train-line.

While in this description of operation the functions or movements of the parts are set forth one after another, yet in actual practice these movements are all so nearly simultaneous that the main slide-valve 55 is maintained substantially stationary in such a position as to uncover port $b$ just far enough to admit air to the train-line at substantially the same rate of increase as obtains through the restricted port to the equalizing-reservoir. The drum 25 is employed in connection with the chamber 11 for the purpose of enlarging the space or capacity of said chamber, so as to enable the port 20 to be made large enough to prevent its being stopped up in actual practice, and while I have shown this drum as also comprising the equalizing-reservoir of the brake-valve I do not limit myself to such a construction, since it is obvious that any other drum or reservoir already in use or a special supplemental reservoir may be used for this purpose, if desired, the same being connected up with the train-line through a restricted passage.

The use of the check-valve 27, with the restricted port or groove in the pipe leading to the equalizing-reservoir, permits a free flow of air outward from said reservoir, so that its usual functions in making service applications of the brakes are not interfered with.

It will be observed that when the engineer's brake-valve is moved from lap to running position for the purpose of maintaining the train-line pressure or for recharging the same and auxiliary reservoirs without releasing the brakes the rate of increase in the train-line pressure is restricted to that determined by the size of the small perforation or leakage-groove communicating with the equalizing or other reservoir connected to the regulating-chamber 11, which rate of increase will be substantially constant, however, regardless of the length or capacity of the train-pipe and of the amount of leakage therein. When it is desired to release the brakes and the brake-valve is thrown to full-release position, the pressure is raised more rapidly in the equalizing-reservoir and forward end of the train-line, so that when the brake-valve is restored to running position and the train-line pressure equalizes itself the higher pressure of the equalizing-reservoir holds the regulating-valve 19 wide open, so that the feed-valve operates to charge up the train-line at its normal rate. In any case of recharging with the brake-valve in running position when the normal train-pipe pressure is reached the diaphragm-valve 59 closes and the feed-valve cuts off further communication from the main reservoir, as usual, until the train-line pressure again diminishes below normal.

It will now be seen that I have provided a feed-control valve device by means of which any desired train-pipe pressure may be maintained while the brakes are applied and by which the auxiliary reservoirs may be slowly recharged to any desired amount without releasing the brakes and irrespective of the length or capacity of the train-pipe.

I believe that I am the first to provide a feed-control-valve device which will so automatically govern the restoration of pressure in the train-pipe when the brakes are in the applied position as to not effect the releasing of the brakes, and hence desire to claim the same broadly. It is to be understood that the invention is not limited to the herein-shown connection with the slide-valve feed-valve hereinbefore described, but may be embodied and arranged in the slide-valve feed-valve case or otherwise embodied or arranged, although I believe the present shown form to be preferable in that it is adaptable to the system of air-brakes now in use without materially changing such system.

Various changes may be made in the construction and arrangement of parts herein shown and described without departing from the scope of the invention as defined in the appended claims.

Having thus fully described my invention, what I claim as new, and desire to secure by Letters Patent, is—

1. In a fluid-pressure brake, the combination with a valve for controlling the supply of fluid under pressure from the main reservoir to the train-pipe and a piston for operating said valve, of a regulating-valve operated by the opposing pressures of the train-pipe on one side and a varying fluid-pressure on the other side for controlling the pressure on one side of said piston.

2. In a fluid-pressure brake, the combination with a valve for controlling the supply of fluid under pressure from the main reservoir to the train-pipe and a piston for operating said valve, of a regulating-valve operated by the opposing pressures of the train-pipe and a variable fluid-pressure for controlling the release of fluid-pressure from one side of said piston.

3. In a fluid-pressure brake, the combination with a valve for controlling the supply of fluid under pressure from the main reservoir to the train-pipe and a piston for operating said valve, of a regulating-valve for controlling the pressure on one side of said piston, a movable abutment exposed on one side to train-pipe pressure for operating said regulating-valve, and means for varying the pressure on the other side of said abutment at a predetermined rate.

4. In a fluid-pressure brake, the combination with a valve for controlling communication from the main reservoir to the train-pipe and a piston for operating said valve, of a regulating-valve for controlling the pressure on one side of said piston, a movable abutment for operating said regulating-valve, and a chamber having a restricted inlet-passage, said abutment being exposed on one side to train-pipe pressure and on the opposite side to the pressure of said chamber.

5. In a fluid-pressure brake, the combination with a train-pipe, engineer's brake-valve and equalizing-reservoir, of a valve for controlling communication from the main reservoir to the train-pipe, a check-valve having a restricted port or groove located in the passage leading to the equalizing-reservoir, and means subjected to the opposing pressures of the train-pipe and the equalizing-reservoir for governing the operation of said valve.

6. In a fluid-pressure brake, the combination with a main reservoir, engineer's brake-valve and train-pipe, of a valve for controlling the supply of fluid to the train-pipe, a piston for operating said valve, a regulating-valve governed by the pressures of the train-pipe and a chamber for controlling the pressure on said piston, and means operated by the movement of the engineer's brake-valve for varying the pressure in said chamber at a predetermined rate.

7. In a fluid-pressure brake, the combination with a main reservoir, engineer's brake-valve and train-pipe, of a valve for controlling the supply of fluid to the train-pipe, a piston for operating said valve, a regulating-valve for controlling the pressure on said piston, a movable abutment subject to the opposing pressures of the train-pipe and a chamber for operating said regulating-valve, and means operated by the movement of the engineer's brake-valve for increasing the pressure in said chamber at a predetermined rate.

8. In a fluid-pressure brake, the combination with a main valve for controlling the supply to the train-pipe and a regulating-valve governed by the train-pipe pressure for controlling the operation of the main valve, and another regulating device subject to opposing fluid-pressures for also governing said main valve.

9. In a fluid-pressure brake, the combination with a main valve for controlling the supply to the train-pipe and a piston for operating said valve, of a regulating-valve normally governed by the train-pipe pressure for controlling the pressure on said piston, and another regulating-valve governed by the train-pipe pressure on one side and a variable pressure upon the other for also controlling the pressure on said piston.

10. In a fluid-pressure brake, the combination with a main valve for controlling the supply to the train-pipe and a piston for operating said valve, of a regulating-valve normally governed by the train-pipe pressure for controlling the pressure on said piston, another regulating-valve having an abutment subject to the opposing pressures of the train-pipe and a chamber for also controlling the pressure on said piston, and means for increasing the pressure in said chamber at a predetermined rate.

11. In a fluid-pressure brake, the combination with a main reservoir, engineer's brake-valve, and train-pipe, of a valve for controlling the supply to the train-pipe, a regulating device governed by the train-pipe pressure for controlling said valve, another regulating device subject to the opposing fluid-pressures of the train-pipe and a chamber for also controlling said valve, and means operated by the movement of the engineer's brake-valve for varying the pressure in said chamber.

12. In a fluid-pressure brake, the combination with a main reservoir, engineer's brake-valve and train-pipe, of a feed-valve device comprising a main valve and piston, a regulating-valve for normally governing the pressure on said piston, and another regulating-valve controlling communication from the piston through the first regulating-valve to the train-pipe.

13. In a fluid-pressure brake, the combination with a main reservoir, engineer's brake-valve and train-pipe, of a feed-valve device comprising a main valve and piston, a regulating-valve for releasing fluid from said piston to the train-pipe, and another regulating-valve operated by the opposing pressures of the train-pipe and a chamber for controlling communication through the first regulating-valve.

14. In a railway fluid-pressure brake system, the combination of a train-line; a brake-valve; a feed-valve designated to maintain the air in the train-line at a predetermined limit; and a regulating-valve provided with a chamber in communication with the train-line, another chamber in communication with the regulating-chamber of the feed-valve and also having a port communication with said first-named chamber; a valve controlling said port; and a device arranged to hold said valve open and also arranged to yield at a predetermined pressure whereby to permit said valve to close, for the purpose set forth.

15. In a railway fluid-pressure brake system, the combination of a train-line; a brake-valve; a feed-valve designated to maintain the air in the train-line at a predetermined limit; and a regulating-valve provided with a chamber in communication with the train-line, another chamber in communication with the regulating-chamber of the feed-valve and also having a port communication with said first-named chamber; a yielding device forming one side of said first-named chamber and arranged to yield at a predetermined pressure; a valve controlling said port and normally held open by said yielding device; and a drum back of said yielding device whereby to increase the space, as set forth.

16. In a railway fluid-pressure brake system, the combination of a train-line; a brake-valve; a feed-valve designed to maintain the air in the train-line at a predetermined limit; and a regulating-valve provided with a chamber in communication with the train-line, another chamber in communication with the regulating-chamber of the feed-valve and also having a port communication with said first-named chamber; a yielding device forming one side of said first-named chamber and arranged to yield at a predetermined pressure; a valve controlling said port and normally held open by said yielding device; a drum back of said yielding device, as set forth; a connection between said drum and the brake-valve; and a leaking check-valve in said connection, for the purpose described.

In testimony whereof I affix my signature in the presence of two witnesses.

LEOPOLD KRIMMELBEIN.

Witnesses:
 G. FERDINAND VOGT,
 FREDERICK S. STITT.